D.C. PUMPED CROSSED-FIELD TYPE OF PARAMETRIC AMPLIFIER

Filed Oct. 25, 1962

INVENTOR.
William M. Sackinger
BY
Hugh H. Drake
Atty.

United States Patent Office 3,234,476
Patented Feb. 8, 1966

3,234,476
D.C. PUMPED CROSS-FIELD TYPE OF PARAMETRIC AMPLIFIER

William M. Sackinger, Mundelein, Ill., assignor to Zenith Radio Corporation, Chicago, Ill., a corporation of Delaware Filed Oct. 25, 1962, Ser. No. 233,025
5 Claims. (Cl. 330—4.7)

The present invention pertains, in general, to parametric amplifiers and is especially directed to parametric amplifiers of the crossed-field type; that is, amplifiers employing mutually perpendicular magnetic and electric fields.

In a copending application of Robert Adler, Serial No. 825,715, filed July 8, 1959, and assigned to the assignee of the present invention, there is a specific discussion of the crossed-field type of electron beam parametric amplifier. In such a structure an electron beam is developed and directed along a path with which there is associated an input coupling device, a modulation expander and an output coupling device arranged in the recited order. Time invariant electric and magnetic fields are developed across the path of beam travel, the two fields themselves being perpendicular to each other. A structure which produces the above fields is the essence of a crossed-field device. On an electron beam flowing in the above fields, radio frequency energy can be carried in the form of an "M-type" cyclotron wave. With this type of crossed-field construction, the magnetic field producing means can be arranged to produce intense transverse magnetic fields which are required for the amplification of high frequencies.

All known practical prior art crossed-field structures have heretofore required a modulation expander or pumping structure utilizing radio frequencies. This necessarily increases the complexity of the pump structure and moreover requires a suitable radio frequency source. Therefore, a pumping structure which requires only constant or D.C. voltages would be highly desirable.

Accordingly, it is a principal object of the invention to provide a parametric amplifier of the crossed-field type having an improved pumping structure.

It is a more specific object of the invention to provide an amplifier of the above type having increased efficiency and constructional simplicity.

A crossed-field type of parametric amplifier, embodying the present invention, comprises means for directing an electron beam along a predetermined path defining a Z direction. There are means for establishing a homogeneous unidirectional magnetic field in an X direction across that path and further means for establishing a homogeneous unidirectional electric field in a Y direction perpendicular to the magnetic field to develop in conjunction therewith a crossed-field condition along the path. Coupling means are disposed along the path for coupling a signal source to the beam to develop cycloidal electron motion in the beam representing an applied signal. Means for expanding the cycloidal electron motion includes a plurality of electrode pairs individually astride the electron path and successively spaced therealong with a predetermined spacing. Means are provided for biasing the electrode pairs for establishing an electric field having non-homogeneous components in the Y and Z directions only, the direction of the non-homogeneous components periodically reversing with distance in the Z direction. Finally, coupling means are disposed along the path for extracting from the beam energy corresponding to the expanded signal.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
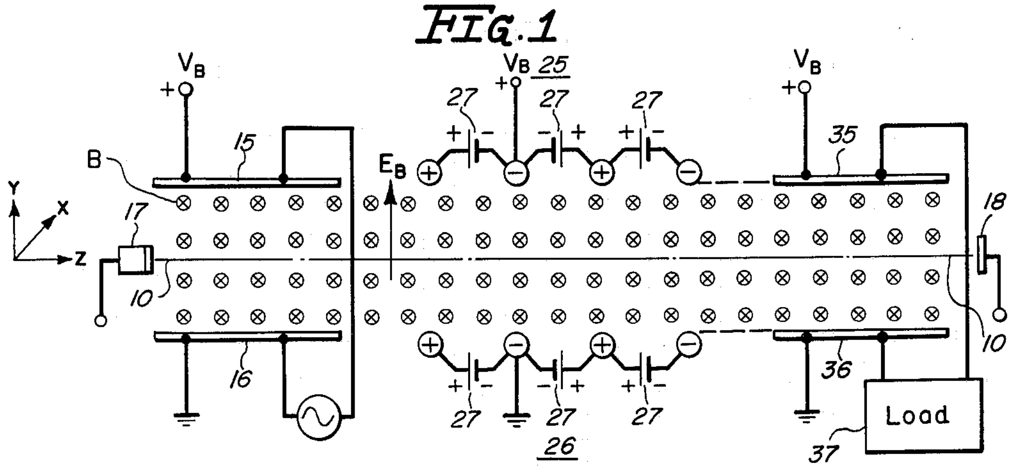
FIGURE 1 is a schematic representation of a crossed-field electron beam parametric amplifier constructed in accordance with the invention.
Figure 3:
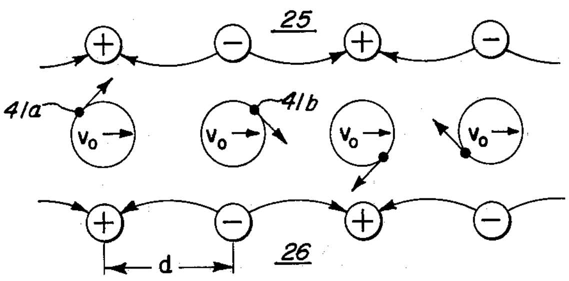
FIGURE 3 is an enlarged portion of the amplifier of FIGURE 1.
Figure 4:
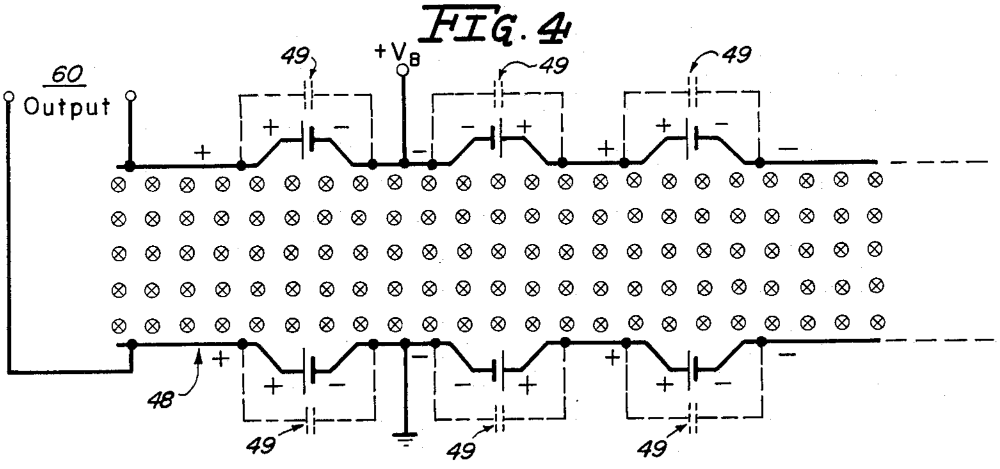
Figure 3A:
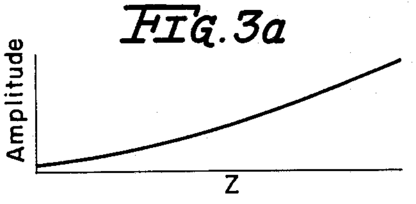

FIGURE 3*a* is a graph useful in understanding the operation of the device of FIGURE 1; and FIGURE 4 is a schematic representation of another form of a crossed-field electron beam parametric amplifier.

Figure 2:
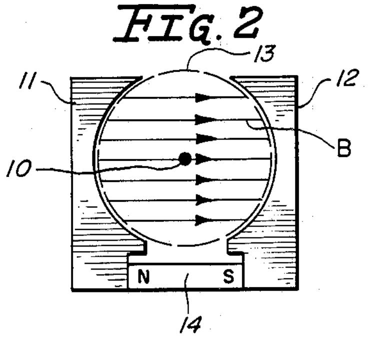
FIGURE 2 depicts a structural detail of the amplifier.

Referring now more particularly to FIGURE 1, the crossed-field type of parametric amplifier there represented has a beam path 10, 10 along which a strip or ribbon type of electron beam is to be directed from a source presently to be described. The field environment of the beam is distinguished from that of the transverse and longitudinal-mode devices by having crossed homogeneous unidirectional magnetic and electric fields. The magnetic field, B, extends across the beam path, being directed in a plane perpendicular to the plane of the drawing and being represented in the conventional manner of a cross within a circle. The means for developing the magnetic field is represented in FIGURE 2 and includes a pair of elongated pole pieces 11, 12 disposed on opposite sides of beam path 10 and extending throughout the entirety of that path. Of course, the structure under consideration is a tube having an enclosing envelope 13 and while the magnetic structure may be enclosed therewithin, it is more convenient to arrange the pole pieces outside of and in close association with the tube envelope as by contouring or shaping of the pole pieces in the manner shown. An energizing permanent magnet 14 is connected to the pole pieces and developes therebetween a uniform transverse magnetic field as represented in the usual way in FIGURE 2.

The means for establishing a homogeneous unidirectional electric field across the beam path and in space quadrature relation to the magnetic field comprises an electrode system having first, second and third portions disposed at first, second and third successive positions respectively along the beam path. These several portions of the electrode system have double functions as will be apparent presently. Considered from the standpoint of electrodes for developing the desired electric field, they may be viewed as two pairs of plates or electrodes designated 15–16 and 35–36 and a grouping of a plurality of electrode pairs designated 25, 26. Plate pairs 15–16 and 35–36 are symmetrically disposed with respect to beam path 10, 10 so that the electric field lines produced by a unidirectional potential voltage $V_B$ across the plates lie in the Y direction as illustrated by vector $E_B$. Electrode pairs 25, 26 comprise rods lying along the X direction, all of the rods having the unidirectional field-producing potential $V_B$ imposed across each individual pair. In the drawing only four pairs are shown, but in a practical device where considerable gain is desired there would be many such pairs. The D.C. potential $V_B$ which is applied across each pair of electrodes establishes an electric field throughout beam path 10, 10 which in conjunction with the magnetic field provides the desired crossed-field condition along the beam path.

A cathode 17 is provided which constitutes means for developing an electron beam of the strip or ribbon type. A collector 18 is provided at the other end of beam path 10, 10 to collect the electrons emitted by cathode 17. Alternatively, a plasma in the interaction space between the plates and electrode pairs may also be utilized as an electron source.

It is understood from studies of the movement of charged particles in fields that an electron injected into crossed homogeneous magnetic and electric fields traverses a generally cycloidal path having both transverse and longitudinal components of motion. Consequently, an input coupler by means of which a signal is to be impressed upon the beam may be of the transverse or longitudinal type or may represent a combination thereof. For the embodiment under consideration, a transverse-mode input coupler is employed as means for coupling a signal source to the beam to develop cycloidal electron motion in the beam representing an applied signal.

More particularly, the electrode pair 15–16 functions as a lumped input coupler in addition to serving as a portion of the electrode system relied upon to establish the requisite electric field. Lumped coupling devices of this type may be considered to have infinite phase velocity and are most useful for operating conditions in which the signal frequency corresponds to the electron resonance or cyclotron frequency established by the magnetic field because such operating conditions result in the establishment of a signal wave on the beam of infinite phase velocity.

Amplification is attained in a parametric type of amplifier by means of a modulation expander for expanding the signal modulation of a beam. The modulation expander serves as a means for subjecting the electrons of the beam to a periodic non-homogeneous field to increase the amplitude of their cycloidal motion. The present invention provides an expander of a particular type which includes the electron pairs 25, 26 which are individually astride beam path 10, 10 and successively spaced therealong with a predetermined spacing. As mentioned above electrodes 25, 26 perform a double function—first, they provide a homogeneous unidirectional electron field as discussed above with reference to the application of potential $V_B$; secondly, the electrode pairs are biased for establishing an electric field having non-homogeneous components in the Y and Z directions only. More specifically, adjacent electrodes are biased by means of batteries 27 to a potential on opposite sides of a predetermined reference potential. The relative polarity of one electrode to the next is indicated by the sign on the electrode. Because of this alternate polarity the non-homogeneous field produced by the electrode pairs periodically reverses with travel or distance in the Z direction.

The non-homogeneous field produced by electrode pairs 25, 26 is illustrated in the drawing of FIGURE 3 where the lines with arrows indicate the typical electric field lines. Thus, if the observer travels along the Z direction it is apparent that the direction of the electric field in the Z direction reverses as each electrode pair is passed and the electric field in the Y direction also reverses as the midplane between electrode pairs is passed. It should be noted that the field in FIGURE 3 illustrates only the non-homogeneous components and does not illustrate the homogeneous component produced by the unidirectional potential $V_B$.

The non-homogeneous field produced by electrode pairs 25, 26 is of the quadrupole type and the specific mechanism by which a quadrupole field expands a signal modulated beam wave is described in an article entitled A Low Noise Electron Beam Parametric Amplifier by Robert Adler, George Hrbek and Glen Wade, published in "Proceedings of the IRE," volume 46, No. 10 under date of October 1958.

The optimum spacing of the electrode pairs is governed by the expression $$d=(n+\tfrac{1}{4})\frac{E_B}{Bf_c}$$

where $d$ is the distance between electrodes, $n$ is an integer and may also be zero, $E_B$ is the homogeneous electric field strength, B is the magnetic field intensity and $f_c$ is the cyclotron resonance frequency of the amplifier. All of the factors of this expression are in "MKS" units.

Beyond the expansion means output coupler 35–36 extracts from the beam the amplified signal energy. It is in all material respects the same as the input coupler, deflector plates 35–36 concurrently serving as the signal portion of the electrode structure and as a means for developing the homogeneous electric field of the amplifier. Plates 35–36 are coupled to a load 37.

In considering the operation of the device, it will be assumed initially that no signal is applied from source 17 to input coupler 15, 16. There is a uniform magnetic field B extending in the X direction and a uniform electric field $E_B$ produced by potential $V_B$ extending in the Y direction. The injected electrons have a forward component of travel in the +Z direction and their injection velocity is so chosen, in relation the ratio of the electric to magnetic field, that, for the assumed no-signal condition, the electrons follow a substantially linear path at a velocity $$v_o=\frac{E_B}{B}$$

through the crossed-field region of the tube to collector 18. The application to input coupler 15–16 of the signal to be amplified, in effect, establishes a transverse dipole field across beam path 10, 10 and deflection-modulates the beam accordingly. This gives rise to a circular motion of the electrons in the YZ plane at the cyclotron frequency, superimposed on their linear motion along the Z axis. Thus, the composite motion of the electrons in the presence of a signal supplied from source 17 is essentially that of a hypocycloid. In other words, the electric field of input coupler 15, 16 is modulated by the signal to be amplified whereby that signal is impressed on the electron beam traveling path 10, 10. This results in the development of an electron wave representing the applied signal; the phase velocity of the electron wave is infinite because the cyclotron frequency has been chosen in this instance to be equal to the signal frequency.

The action of expansion means 25, 26 on an electron which is injected into its non-homogeneous field from input coupler 15, 16 is illustrated in FIGURES 3 and 3*a*. An electron 41*a* is shown as being injected with the most favorable phase position relative to the pumping or expansion structure. The linear velocity mentioned above is illustrated by the vector $v_o$. The electron 41*a* has a velocity vector which is parallel to the electric field and thus achieves a maximum gain in tangential velocity. As the electron progresses in its cycloidal path to the next electrode pair, it is in the position shown in 41*b* and is again tangent to the electric flux vector. Thus, as the electron 41 passes through the electrode pair structure 25, 26 its cycloidal amplitude undergoes an exponential growth as shown in the curve in FIGURE 3*a*. However, on the average only one-half of the electrons will enter the expansion structure in a phase favorable for amplification; the other one-half will have their motion deamplified and will give up energy to the expansion structure. Nevertheless, the amplification and deamplification both occur exponentially, and the combination of amplification and deamplification yields a net gain as seen at the output coupler 35–36. The foregoing is more fully explained in the above-mentioned Adler, Hrbek, and Wade article.

The illustration of FIGURE 3 shows only one complete cycle of amplification or expansion of the cycloidal electron motion. In actual practice a great many electrode pairs would be used, the number depending on the degree of amplification desired.

As described above in connection with FIGURE 1, it is the usual practice to position an input coupler, an expander, and an output coupler in the recited order at spaced points along the beam path. Where the components are separate and distinct from one another the amplifier is unconditionally stable because there is no coupling from the output to the input coupler. This is a most desirable property of the device and is preserved in the structure represented in FIGURE 4 through the expedient of combining the expander with the output coupler while utilizing a separate and distinct structure for the input coupler. In principle, both couplers may be combined with the expander but, for the reasons stated, the input coupler is not included in the combined structure of FIGURE 4. If a combined structure is utilized a negative resistance device will result.

More specifically, the arrangement of FIGURE 4 is an expansion structure, like in FIGURE 1, combined with an output coupler. It has plates 48 instead of rod electrodes 25, 26 shown in FIGURE 1. The bias potentials are applied in the same manner as shown for the expansion structure. A terminal pair 60 serves as the output of the device. Radio frequency energy is coupled from one plate to another by means of the capacitance which exists between the plates due to their close proximity to each other as indicated schematically by the capacitors 49.

In operation, the cyclotron orbits are simultaneously amplified by the non-homogeneous field and their energy is removed by the radio frequency coupler field. The cyclotron orbits are always prevented from becoming too large and the optimum amount of potential energy is extracted. This is in contrast with the expansion structure of FIGURE 1 in which amplification should not exceed that value at which the expansion of the wave causes electron interception by the electrodes. With this type of combined coupler-expansion structure, a very high efficiency is possible.

Thus, the invention provides a crossed-field type parametric amplifier which has improved efficiency and in which complex radio frequency energy sources are avoided and construction is simplified.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A crossed-field type of electron beam parametric amplifier comprising:

means for directing an electron beam along a predetermined path defining a Z direction;

means for establishing a homogeneous unidirectional magnetic field across said path, the flux lines of said field defining an X direction;

means for establishing a homogeneous unidirectional electric field across said path perpendicularly to said magnetic field to establish in conjunction therewith a crossed-field condition along said path, the flux lines of said field defining a Y direction;

coupling means disposed along said path for coupling a signal source to said beam to develop cycloidal electron motion in said beam representing an applied signal;

means for expanding said cycloidal electron motion including a plurality of electrode pairs individually astride said path and successively spaced therealong with a predetermined spacing;

means for biasing said electrode pairs for establishing an electric field having non-homogeneous components in said Y and Z directions only, the directions of said non-homogeneous components periodically reversing with distance in said Z direction;

and coupling means disposed along said path for extracting from said beam energy corresponding to said signal.

2. A crossed-field type of electron beam parametric amplifier according to claim 1 in which said expansion means includes at least one of said coupling means.

3. A crossed-field type of electron beam parametric amplifier according to claim 1 in which the number of said reversals of said non-homogeneous components correspond to the number of said electrode pairs.

4. A crossed-field type of electron beam parametric amplifier comprising:

means for directing an electron beam along a predetermined path defining a Z direction;

means for establishing a homogeneous unidirectional magnetic field across said path, the flux lines of said field defining an X direction;

means for establishing a homogeneous unidirectional electric field across said path perpendicularly to said magnetic field to establish in conjunction therewith a crossed-field condition along said path, the flux lines of said field defining a Y direction;

coupling means disposed along said path for coupling a signal source to said beam to develop cycloidal electron motion in said beam representing an applied signal;

means for expanding said cycloidal electron motion including a plurality of electrode pairs individually astride said path and successively spaced therealong with a predetermined spacing;

means for biasing adjacent electrodes to potentials on opposite sides of a predetermined reference potential, for subjecting the electrons of said beam to a periodic non-homogeneous field to increase the amplitude of their cycloidal motion;

and coupling means disposed along said path for extracting from said beam energy corresponding to said signal.

5. A crossed-field type of electron beam parametric amplifier in accordance with claim 1 in which the predetermined spacing, $d$, of said electrode pairs is governed by the expression $$d = (n + 1/4)\frac{E_B}{Bf_c}$$

where $n$ is an integer or zero, $E_B$ is said homogeneous electric field strength, B is said magnetic field intensity and $f_c$ is the cyclotron resonance frequency of the amplifier, all of the above factors being expressed in meter-kilogram-second units.

No references cited.

ROY LAKE, *Primary Examiner.*